United States Patent [19]

Plunguian et al.

[11] 4,007,920
[45] Feb. 15, 1977

[54] MIXING AND AERATING DEVICE

[76] Inventors: Mark Plunguian, 6912 Columbia Drive; Charles E. Cornwell, 7104 Marlan Drive, both of Alexandria, Va. 22307

[22] Filed: Sept. 27, 1974

[21] Appl. No.: 509,940

Related U.S. Application Data

[63] Continuation-in-part of Ser. No. 392,643, Aug. 29, 1973, abandoned.

[52] U.S. Cl. .............................................. 259/108
[51] Int. Cl.² .......................................... B01F 7/16
[58] Field of Search .......... 259/107, DIG. 25, 108, 259/100, 101, 117, 118, 119, 121, 122, 123, 124, 102, 111, 114; 68/113, 122, 123, 215, 216, 219

[56] References Cited
UNITED STATES PATENTS

| | | | |
|---|---|---|---|
| 273,084 | 2/1883 | Hoppes | 259/108 |
| 580,266 | 4/1897 | Franklin | 259/108 |
| 1,681,464 | 8/1928 | Cameto | 259/101 |
| 1,754,626 | 4/1930 | Holzhausen | 259/101 |
| 2,557,564 | 6/1951 | Renner | 259/108 X |
| 3,378,141 | 4/1968 | Warman | 259/108 X |
| 3,912,237 | 10/1975 | Ostberg | 259/47 |

*Primary Examiner* — Philip R. Coe

[57] ABSTRACT

A mixing and aerating device is disclosed involving an impeller having the shape of a circular symmetrical curved section mounted centrally on a shaft which is driven at a relatively high rate of speed in the mixing container. The curved section may be formed as a section of a hollow sphere, the frustum of a cone, a section of a hyperbola, or a cylinder. The preferred forms of mixing and aerating devices are positioned with their curved hollow concave surfaces faced downwardly into the mix, although nearly as effective results are obtained with their surfaces reversed, i.e., with the concave surface facing upwardly and their convex or non-concave surfaces facing downwardly. Improved results are obtained, particularly increased foaming action, by providing a plurality of openings near the peripheral edge of the impellers. Further, the concave section may comprise the whole or part only of the symmetrical circular impeller. Two or more impellers may be mounted on the driven shaft in axially spaced relation.

7 Claims, 22 Drawing Figures

MIXING AND AERATING DEVICE

CROSS REFERENCE TO RELATED APPLICATION

This application is a continuation-in-part of our co-pending application Ser. No. 392,643, filed Aug. 29, 1973, and now abandoned, for Mixing and Aerating Device.

BACKGROUND OF THE INVENTION

1. Field of the Invention

This invention relates to a mixing and aerating device for use with relatively high speed rotating equipment such as portable electric drills, drill presses, or other shaft mixer drive mechanisms. More particularly, it relates to an impeller of special design and construction attached to the end of a mixing shaft adapted to be retained in a rotating drive device. For certain applications additional impellers may be stacked along or carried by the driven shaft in axially spaced position.

2. Description of the Prior Art

The conventional propeller type blade impellers of the prior art are designed primarily for propelling, i.e., pushing against the liquid mix and creating an axial flow of the liquid. When used for mixing, it does so by creating turbulence and consuming appreciable power. Furthermore, it is not a satisfactory mixer for viscous liquids and is a very poor producer of foam if this should be desired.

SUMMARY OF THE INVENTION

It is therefore a primary object of the present invention to provide an impeller device of novel structure which will perform a dual mixing function efficiently and at a relatively low power consumption. When the impeller blade is inserted well below the liquid level of the mix and is operated in the submerged condition, it functions as an efficient mixing device even in viscous liquids. Furthermore, when the impeller is operated near the surface of the liquid mix it becomes a most efficient aerator for generating foam. By raising or lowering the impeller, or the container holding the liquid mix, or by changing the liquid level in the mixing vessel, the same impeller device can function in either of these two ways, or predominately in one or the other type of mixing operations or procedures, as desired.

For heavy viscous liquids it is desirable to start at a relatively low speed and gradually increase the rate of rotation as the thixotropic action develops and the liquid mass becomes more fluid. The impeller device can be used most effectively for dispersing or redispersing solid particles in a minimum amount of liquid. Furthermore it can be used for dispersing a fibrous component most uniformly. The smooth symmetrical impeller greatly minimizes the formation of strings or fiber bundles.

In the aerating position, the mixer can be used most efficiently for producing foam in the presence of a very low concentration of a suitable foaming agent. For example, it can be used effectively for aerating sewage in accordance with the activated sludge process. In the latter case the thorough exposure of each part of the sludge to the air produces a faster, more thorough activation while saving on the expensive operation of air compressors.

Additionally, foam so generated, depending on the liquid contents of the mix selected, can be employed in making cementitious light weight building slabs and panels useful in the building trades; for producing foam to be used on landing fields and elsewhere to assist in fire fighting procedures; for use in insulating various areas; and for a variety of other useful purposes where a foamed product is generally needed.

Another object of the invention is to provide a mixing device which is rugged yet inexpensive to produce. The mixing impeller can be made of any one of a variety of materials. It can be fashioned from metals, by shaping resin-impregnated cloth on a mold and curing, and by molding in plastics or in rubber. The impeller may be attached to the shaft by any suitable means, or it may be fashioned integrally with the shaft.

As so constructed, it will be observed that the impeller device is formed of a relatively thin walled section in relation to its over-all diameter, possessing open and closed faces, with the open face generally presenting a concave interior surface and the closed face presenting a convex exterior surface, although in some instances the closed face may comprise a planar form, as will be explained hereinafter in connection with FIGS. 3, 5, 14 and 17.

In any event, the impeller may be said to possess at least one curved symmetrical surface that is a concave surface. For the purpose of describing this invention in the various forms set forth in the drawings, the term "concave" surface is defined to include not only its generally restricted meaning as a section of the inside of a hollow sphere, but also this term shall encompass any symmetrically hollow section, such as the frustrum of a cone, section of the inside of a hyperbola, or a section of a hollow cylinder.

In general, it may be said that the impeller of the present invention embodies any enclosed space symmetrically mounted on a rotatable shaft with the hollow section generally directed towards the bottom of the mixing vessel containing the fluid. This enclosed space can be a section of a hollow sphere, a cone frustrum, or section of a closed hollow hyperbola, i.e., any symmetrical section departing from a plane, flat disc, with the concave section directed downwardly for the most efficient operation. When such an impeller is rapidly rotated wholly within the liquid medium it functions as an efficient high-shear mixing device and when it is positioned near the surface of the liquid medium, so that only the edge of the impeller is revolving in the liquid with the main body of the impeller exposed to the air above the liquid, it acts as an efficient aerator.

Other objects of the invention will in part be obvious and will in part appear hereinafter. The invention accordingly comprises a mixing and aerating device possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein like reference numerals have been employed in the different figures to denote the same parts and wherein.

DESCRIPTION OF THE ILLUSTRATED EMBODIMENTS OF THE INVENTION

Figure 1:
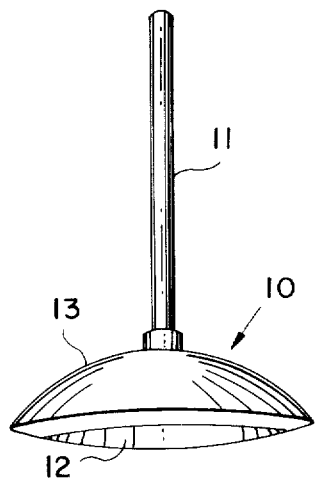
FIG. 1 is a perspective view of one form of impeller of the invention mounted on a shaft with FIG. 2 being a bottom end plan view of the FIG. 1 form.

In the drawings are disclosed various embodiments of an impeller constructed in accordance with the invention and which have been tested and found to be efficient in operation and which function in accordance with the basic concepts recited above.

Figure 2:
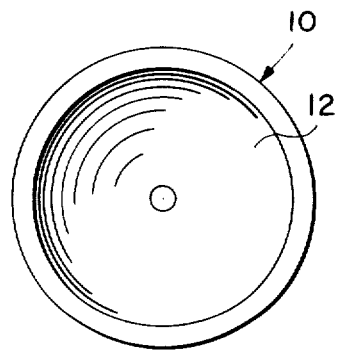

In FIGS. 1 and 2 there is shown the preferred embodiment of the impeller which comprises a section 10 of the inside of a sphere suitably mounted on a shaft 11 which is adapted to be held and driven by any suitable high speed rotating equipment (not shown). The impeller 10, it will be noted, is provided with concave and convex surfaces 12, 13 which form a hollow relatively thin walled domed, imperforate shell, as compared to the diameter of the impeller.

The axial depth of the domed shell is not particularly critical, but it should be sufficiently deep to provide an adequate hollowed out concave interior portion. For most efficient operation, the diameter of the impeller 10 should be approximately two-thirds (2/3) the diameter of the mixing vessel and a rotational speed of approximately 2,250 to 3,000 r.p.m. should be obtained in small sized impellers. For most efficient operation, the impeller, irrespective of its diameter and size, should be rotated with a tip speed in the neighborhood of 30 miles per hour.

The mixing shaft and device can be driven from a top source of power or driven from a bottom source of power in which event the drive would include a sealed bearing extending through the bottom of the mixing vessel.

Figure 19:
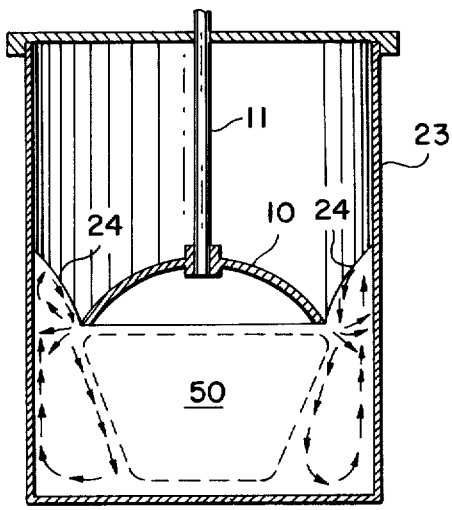
FIGS. 19 and 20 are diagramatic views of a vessel and an impeller positioned therein to aerate the fluid and mix the fluid, respectively, and indicating by arrows the general flow patterns of the fluid during rotation of the impellers.

When the rotating impeller 10 is positioned in the mixing vessel 23 with only its lower edge portion in the liquid and the major portion of the impeller exposed to the air above the liquid level, as seen in FIG. 19, the level rises against the wall of the vessel as shown at 24—24. The impeller discharges forcefully streams of liquid outwardly of the impeller against the wall of liquid and air, or other gas, from above is pulled in and injected into this liquid flow giving thorough aeration and an excellent foaming action.

Figure 20:
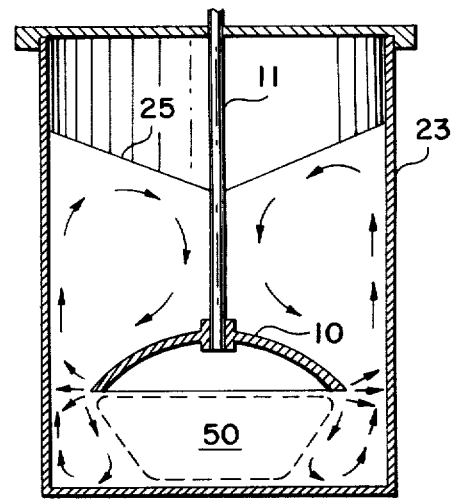

When the impeller 10 is submerged in the liquid mix as seen in FIG. 20, particularly with higher viscosity liquids, the liquid level 25 is not altered significantly and a relatively small vortex is created. Rapid intermixing takes place below the surface and outside air is not admixed.

The mixing efficiency of this impeller was originally believed to be due to the creation of a partial vacuum beneath the impeller when the liquid was forcefully discharged at the periphery of the impeller by centrifugal action during high speed rotation. A strong pull of the impeller towards the bottom of the vessel was experienced. However, it is now believed that the theory of the creation of a vacuum may, in part, be wrong. Instead, it is believed that an air zone or bubble, as shown at 50 in dotted lines, is actually created directly beneath or under the impeller, with a part of the liquid just below the central portion of the air bubble actually non-moving. The vortex line of liquid and air above the impeller does continue in the same straight line to the outline of the air bubble and the mixing action and flow is as generally indicated by the flow arrows in FIGS. 19, 20, and 21.

The air zone or bubble 50 beneath the impeller can best be described as bearing a marked resemblance to the condition existing in the eye of a hurricane or typhoon where a rather still area or zone of air exists not having any appreciable plus or minus pressure factor, a phenomenon of centrifical force.

While there may be some uncertainty as to the exact reason for a strong pulling force experienced on the impeller assembly towards the bottom of the vessel during rapid rotation, it is definitely believed that it is due, at least in part, to the forceful stream of liquid issuing from the periphery of the impeller towards the walls of the container.

Figure 11:
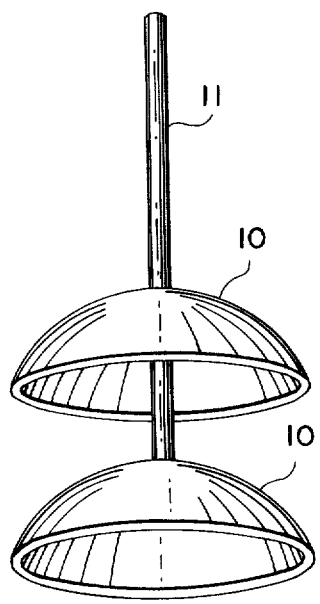
FIG. 11 is a perspective view showing two concave impellers mounted on a single mixer shaft.
Figure 21:
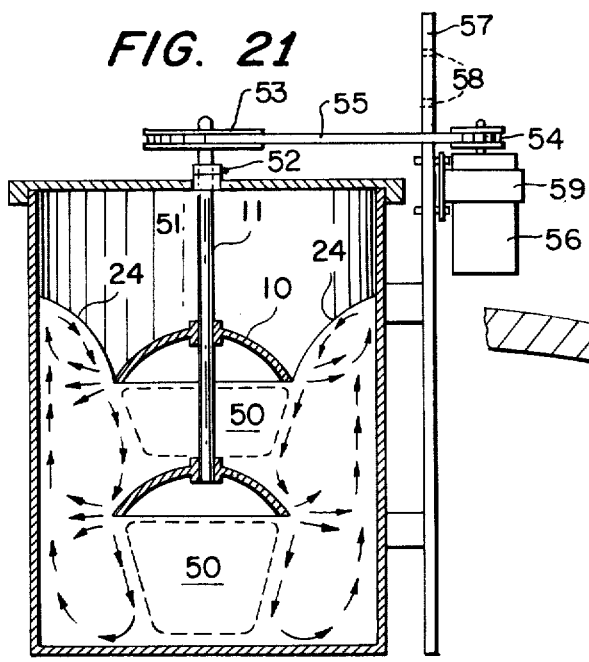
FIG. 21 is a further diagramatic view of a mixing vessel with two impellers mounted on a common driven shaft with the general flow pattern of the fluid indicated by arrows.

In FIG. 11 there is disclosed two impellers 10 of the type shown in FIGS. 1 and 2 stacked in spaced relation on a common mixer shaft 11 and in FIG. 21 such a multiple impeller arrangement is shown in connection with a vessel for the production of foam. In FIG. 21 the general flow pattern of the fluid has also been indicated by arrows. Any number of impellers can be stacked on the shaft 11 depending on the dimensions of the vessel and the function desired.

While so far the preferred form of impeller of FIGS. 1 and 2 has been discussed and used in the explanation, other forms of impellers have been found to be equally effective and will now be discussed.

Figure 3:
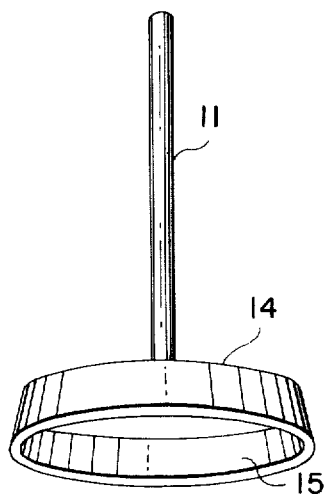
FIG. 3 is a perspective view of another form of impeller mounted on a shaft with FIG. 4 being a bottom end plan view of the FIG. 3 form of the invention.
Figure 4:
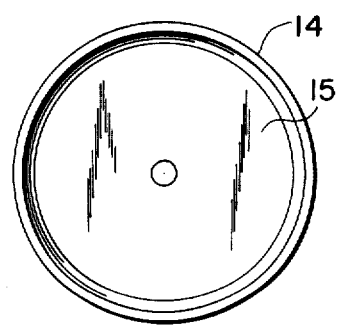

In FIGS. 3 and 4 the impeller 14 is formed as a section of a conical frustum provided with a hollow interior 15 bounded by the tapered side wall extending downwardly from a relatively flat top portion.

Figure 5:
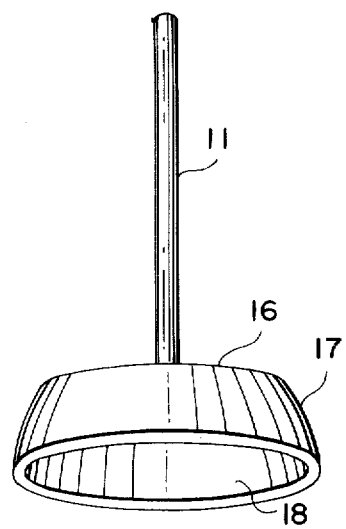
FIGS. 5, 7, and 9 are all perspective views of further forms of the impeller with FIGS. 6, 8, and 10 being bottom end plan views of the respective forms of impellers shown in FIGS. 5, 7, and 9.
Figure 6:
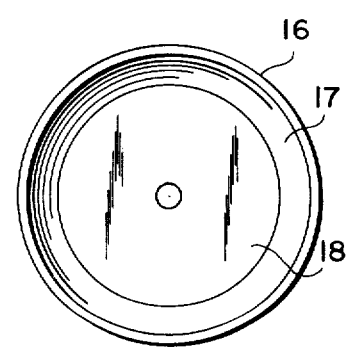

FIGS. 5 and 6 disclose a further modification embodying a section 16 of a hyperbola frustum with a relatively deep curved side wall 17 extending downwardly from a relatively flat top and providing a hollow interior 18.

Figure 7:
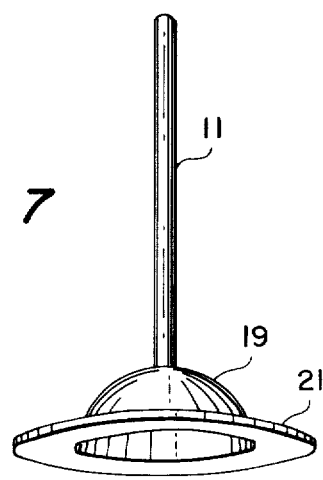
Figure 8:
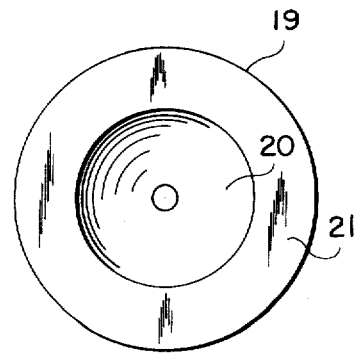
Figure 9:
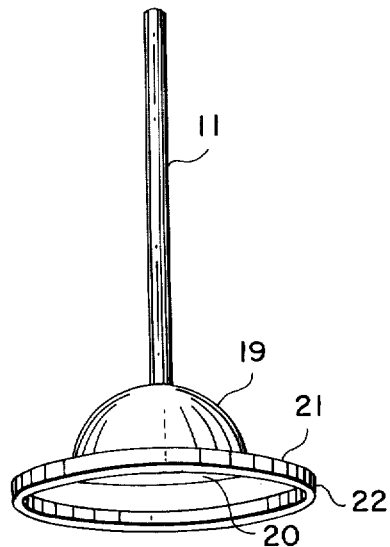
Figure 10:
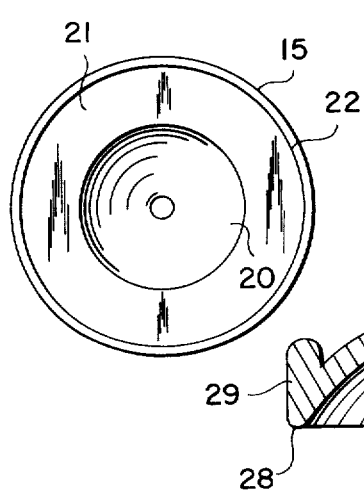

In FIGS. 7 and 8 there is shown an impeller having a centrally disposed spherical section 19 forming a concave interior 20, surrounded by an outwardly extending flat circular section 21. In FIGS. 9 and 10 the centrally disposed spherical section 19 has its outwardly extending flat circular section 21 provided with a downwardly turned lateral rim portion 22, which seems to improve the foaming action of the device.

Figure 12:
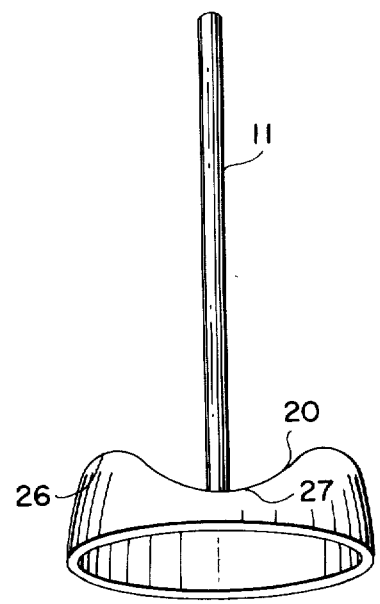
FIG. 12 is a perspective view of still a further modification of impeller.

Another embodiment of impeller is shown in FIG. 12 which employs a combination of symmetrically disposed concave 26 and convex 27 surfaces on the hollow interior of the impeller shell.

Figure 13:
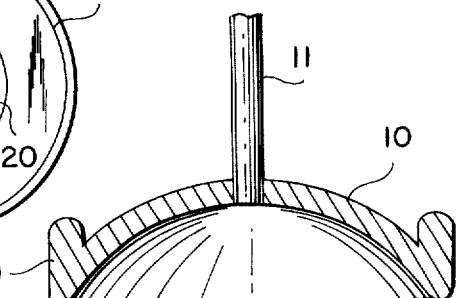
FIG. 13 is a vertical sectional view of a further modification somewhat similar to the FIG. 1 form of impeller but having the peripheral edge built up to provide a larger lateral surface.

It has also been determined that if the peripheral edge portion 28 of the impeller is built up slightly as seen in FIG. 13 to provide a larger lateral surface 29 the mixing and foaming results obtainable are enhanced.

Figure 14:
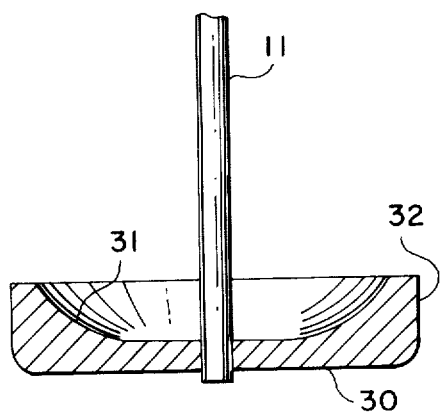
FIGS. 14 and 15 are vertical sectional views of further modifications with the impellers in a reversed position to the forms previously shown.
Figure 15:
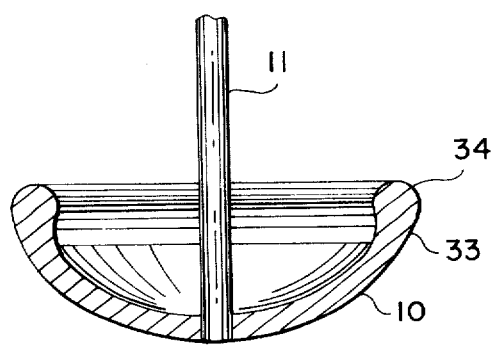

While all of the impellers so far described have been disposed with their concave or hollow interior portion adapted to be faced downwardly in the liquid mix, toward the bottom of the vessel, it has been found possible to use some of the impellers in a reversed position, i.e., with the hollow or concave portion faced upwardly, such as shown in FIGS. 14 and 15, with almost as effective results, particularly if a lateral peripheral surface is included in the impeller structure. For example, the impeller 30 shown in FIG. 14 which is a section through a cylinder, or through a cone such as in FIG. 3, or a hyperbola such as in FIG. 5, can be employed effectively provided the interior inside corners are suitably contoured as at 31 to present a concave surface which will prevent any solid material in the mix from being trapped therein. Such an impeller is provided with a lateral peripheral surface 32.

In FIG. 15 the impeller 10 of the FIG. 1 form can also be effective in a reversed position of use provided the peripheral edge 33 is built up as shown at 34.

Figure 17:
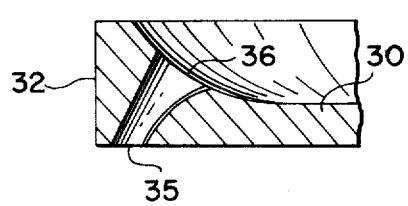
Figure 18:
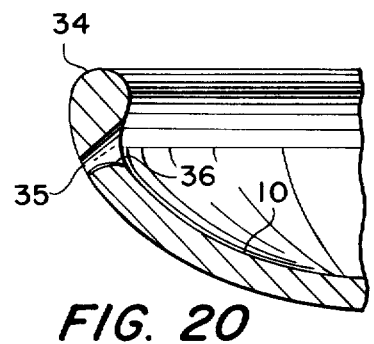

It has also been found that the foaming tendency of any of the impellers can be greatly improved and accelerated by providing openings, holes, or slits through the peripheral edges of the impellers as close as possible to the outer edges but without marring the lateral surfaces. This is shown in the enlarged fragmentary sections of FIGS. 16, 17, and 18 through the tips of the impellers of 13, 14, and 15, respectively. The openings 35, are preferably provided with widened or scooped-out inlets 36 leading from the upper surface of the peripheral edges with their exits being arranged as close as possible to the lower peripheral edge of the impellers as shown. A plurality of such openings 35 are preferably equispaced around the peripheral edge of the impellers and provide for the air to be scooped in and driven into the streaming liquid issuing from the edges of the impellers.

Figure 16:
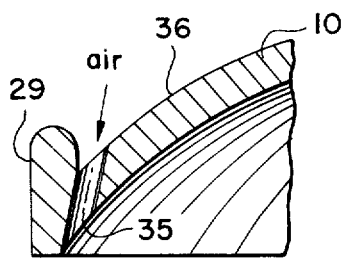
FIGS. 16, 17, and 18 are enlarged fragmentary sectional views through the tip portions of the impellers of FIGS. 13, 14, and 15, respectively, showing the disposition of openings near the peripheral edge of these impellers to improve the aerating effect.
Figure 22:
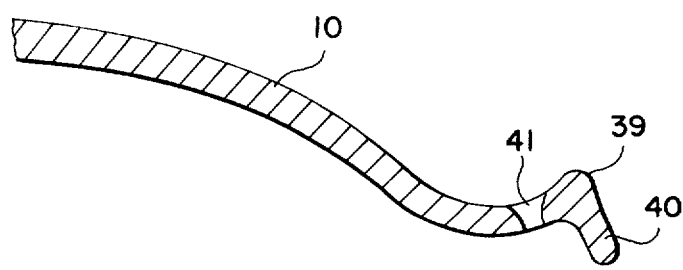
FIG. 22 is an enlarged fragmentary sectional view of the tip portion of a further modification of the impeller.

In FIG. 22 there is shown a fragmentary section of a further modification of the peripheral tip portion of an impeller of the FIG. 1 type which embodies some of the principles of the FIGS. 13 and 16 modifications and which is particularly adaptable in instances where relatively large diameter impellers are employed. Here the tip portion is built up at 39 to provide a lateral edge portion 40 and openings 41 having scooped-out inlets to pull in the air from above and drive it into the liquid forcefully issuing from the tip of the impeller.

FIG. 21 shows one means of adjusting the impeller for vertical positioning with respect to the level of liquid in the container and a means of driving the impeller at a relatively high rate of speed. 51 is a bearing for the vertical shaft; 52 is a set screw; 53 and 54 are pulleys; 55 is a belt drive; 56 is an electric motor; 57 is a steel plate attached to the container; 58 are bolt holes spaced along the steel plate for adjusting the height of the motor and mount 59.

As pointed out above, any of these impeller structures may be stacked on a single mixer shaft in axial spaced relation, primarily for more effective foaming action. In a larger set-up when the assembly is in a fixed position, the series of impellers is assurance that as the level of foaming liquid rises in the vessel, it will not be excluded from access to the air, so that the level of foam may further rise to its maximum extent.

Whereas particular embodiments of the invention have been described above for purposes of illustration, it will be evident to those skilled in the art that numerous variations of the details may be made without departing from the invention as defined in the appended claims.

What is claimed is:

1. A mixing and aerating device comprising a mixing container containing liquid material to be mixed or aerated, a vertically extending shaft supported for vertical movement and adjustably fixed relative to container, drive means adapted to be attached to said shaft for rotating said shaft at high relative speed, at least one mixing impeller attached symmetrically centrally to said shaft, said impeller comprising an imperforated relatively thin-walled symmetrical closed concave surface of a hollow sphere, said concave surface being disposed downwardly with the open end facing the bottom of said container, said symmetrical section being of such dimension with respect to said container to provide an opening adjacent the periphery of said impeller and said container for leading liquid and air from above the impeller through and opening to the lower side of said impeller toward the bottom of said container to thoroughly intermix said liquid and air; and said liquid being forcefully impelled outwardly from the periphery of said impeller.

2. An impeller as defined in claim 1, wherein said concave surface is an inner wall surface of said impeller.

3. An impeller as defined in claim 1, wherein said impeller is provided with an upstanding peripheral edge portion increasing the lateral side edge of said impeller.

4. An impeller as defined in claim 1, wherein said symmetrical section is provided with a plurality of through apertures arranged near the periphery of said impeller for leading air from above said impeller through to the lower side of said impeller adjacent to the peripheral tip portion thereof to thoroughly intermix with the streaming liquid being forcefully impelled outwardly from the periphery of said impeller.

5. An impeller as defined in claim 4, wherein said apertures are provided with flared or scooped-out inlets on the upper surface of the impeller.

6. An impeller as defined in claim 1, wherein said concave surface is attenuated into a substantially flat circular symmetrical outwardly directed section disposed in a plane normal to the axis of rotation.

7. An impeller as defined in claim 6, wherein said flat circular outwardly directed section is provided with a downwardly directed rim portion.

* * * * *